(12) United States Patent
Zavadyak et al.

(10) Patent No.: US 11,630,081 B2
(45) Date of Patent: Apr. 18, 2023

(54) METHOD FOR NON-DESTRUCTIVELY EXAMINING AN ANODE OF AN ALUMINIUM ELECTROLYSIS CELL

(71) Applicant: OBSHCHESTVO S OGRANICHENNOY OTVETSTVENNOST'YU "OBEDINENNAYA KOMPANIYA RUSAL INZHENERNO-TEKHNOLOGICHESKIY TSENTR", Krasnoyarsk (RU)

(72) Inventors: Andrej Vasil'Evich Zavadyak, Krasnoyarsk (RU); Il'Ya Ivanovich Puzanov, Krasnoyarsk (RU); Yurij Nikolaevich Popov, Krasnoyarsk (RU); Dmitrij Valer'Evich Petrenko, Krasnoyarsk (RU); Andrej Valerievich Mishurov, Krasnoyarsk (RU); Margarita Gabdullaevna Berngardt, Krasnoyarsk (RU)

(73) Assignee: OBSHCHESTVO S OGRANICHENNOY OTVETSTVENNOST'YU "OBEDINENNAYA KOMPANIYA RUSAL INZHENERNO-TEKHNOLOGICHESKIY TSENTR", Krasnoyarsk (RU)

( * ) Notice: Subject to any disclaimer, the term of this patent is extended or adjusted under 35 U.S.C. 154(b) by 0 days.

(21) Appl. No.: 17/057,580

(22) PCT Filed: Jul. 24, 2018

(86) PCT No.: PCT/RU2018/000489
§ 371 (c)(1),
(2) Date: Nov. 20, 2020

(87) PCT Pub. No.: WO2019/226067
PCT Pub. Date: Nov. 28, 2019

(65) Prior Publication Data
US 2021/0208102 A1    Jul. 8, 2021

(30) Foreign Application Priority Data
May 21, 2018   (RU) ................................ 2018118713

(51) Int. Cl.
*G01N 27/82*           (2006.01)
(52) U.S. Cl.
CPC ................................. *G01N 27/82* (2013.01)
(58) Field of Classification Search
CPC combination set(s) only.
See application file for complete search history.

(56) References Cited

U.S. PATENT DOCUMENTS 3,315,155 A * 4/1967 Colani ...................... G01V 3/10
324/336
5,473,248 A * 12/1995 Haldemann ........ G01N 27/9046
324/237
(Continued)

FOREIGN PATENT DOCUMENTS

RU       2057321 C1    3/1996
RU       2057327 C1    3/1996
(Continued)

OTHER PUBLICATIONS

International Search Report and Written Opinion dated Feb. 7, 2019 in connection with International Application No. PCT/RU2018/000489, 7 pages.
(Continued)

*Primary Examiner* — Jennifer Bahls
(74) *Attorney, Agent, or Firm* — Baker & McKenzie LLP (57) ABSTRACT

The method for non-destructive flaw detection of aluminium reduction cell anodes is claimed, including the building of a
(Continued)

computed model of an anode or the use of a specified model with the known data on the geometry and specific resistance of the anode, the geometry and coordinates of internal defects, wherein several cyclic calculations are carried out; the results of calculations are represented in the form of a 3D-matrix of amplitudes and directions of vectors of calculated intensities or inductions of the electromagnetic field at the discretization points near the outer surface of the anode; at least a pair of electrically conductive contacts that supply the specified amount of electrical current through the anode are placed on the outer surfaces of the inspected anode; at least one sensor is placed near the outer surface of the inspected anode, and the amplitude and direction of the magnetic field intensity or induction vectors are measured and represented as a 3D-matrix of measured magnetic field intensity or induction vectors; the 3D-matrices of calculated and measured magnetic field intensity or induction vectors at the same discretization points near the outer surface of the anode are compared; and, based on results, the sizes and coordinates of internal defects are observed. As a result, the informational value and accuracy of determining the location of defects are increased; the process capabilities of the method are expanded by reducing the instability of transition resistances of the contact area in the stub holes of the anode; the confidence and reliability of flaw detection by measuring the magnetic field intensity vectors with contactless sensors are improved.

7 Claims, 3 Drawing Sheets

(56) References Cited

U.S. PATENT DOCUMENTS

| 2009/0136122 | A1 | 5/2009 | Gagne et al. |
| 2012/0235693 | A1* | 9/2012 | Feng ..................... G01N 27/20 324/693 |
| 2017/0089855 | A1* | 3/2017 | Kocaefe ................. G01N 27/20 |
| 2017/0307566 | A1 | 10/2017 | Ishikawa et al. |

FOREIGN PATENT DOCUMENTS

| RU | 2584726 C1 | 5/2016 |
| SU | 1462172 C1 | 2/1989 |

OTHER PUBLICATIONS

Guillaum Leonard et al., "MIREA—An on-line real time solution to check the electrical quality of anodes", Proceedings of 33rd International ICSOBA Conference, 2015, 12 pages.

Jenks, W.G. et al., "Squids for Nondestructive Evaluation", Journal of Physics D: Applied Physics, vol. 30, No. 3, Feb. 7, 1997, pp. 293-323, XP000692278, https://doi.org/10.1088/0022-3727/30/3/002.

* cited by examiner

METHOD FOR NON-DESTRUCTIVELY EXAMINING AN ANODE OF AN ALUMINIUM ELECTROLYSIS CELL

CROSS-REFERENCE TO RELATED APPLICATIONS

This application is a U.S. National Stage entry of and claims priority to PCT Application No. PCT/RU2018/000489 filed Jul. 24, 2018, which itself claims priority to Russian Patent Application No. 2018118713 filed May 21, 2018. The contents from all of the above are hereby incorporated in their entirety by reference.

TECHNICAL FIELD

The invention relates to the field of flaw detection (non-destructive inspection) of anodes for aluminium reduction cells and may be used in non-ferrous metallurgy, where conducting electrodes are used.

PRIOR ART

In the production of primary aluminium by reduction, a significant amount of prebaked carbon anodes is consumed in the process. For such anodes to operate efficiently and reliably, carbon anode blocks should have as little electrical resistance as possible and not have internal cracks, cavities or electrical resistance irregularity. Moreover, both aluminium manufacturers and anode manufacturers must control the quality of anodes as to electrical resistance irregularity, cracks, cavities until the moment when the anode starts operation in the cell. Thus, the non-destructive inspection of anodes for aluminium cells is an urgent task.

The methods and devices for non-destructive flaw detection (inspection) of electrical resistance irregularity, the principle of which is based on the use of Ohm's law, are described in such works as M. J. Chollier-Brym, D. Laroche, A. Alexandre, etc., New MIREA method for representative measurement of anode electrical resistance II Light Metals, 2012, pp. 1299-1302; U.S. Pat. No. 3,735,253 Edward J. Seger, etc., ALCOA, Method and means for measuring electrode resistance, 1971; U.S. Pat. No. 7,576,534 Daniel Andet, etc., Universite Du Quebec, System and method to forecast the electrical conductivity of anodes for aluminium production before baking, 2009; Nedeltcho Kandev, Hugues Fortin, Sylvain Chenard, et al., New apparatus for characterizing electrical contact resistance and thermal contact conductance II Light Metals, 2011, pp. 1003-1008; Susann Beier, John J. J. Chen, Hugues Fortin, et al., FEM analysis of the anode connection in aluminium reduction cells II Light Metals, 2011, pp. 979-984; Mark A. Cooksey, William Yang, PIV measurements on physical models of aluminium reduction cells II Light Metals, 2006, pp. 359-365; U.S. Pat. No. 3,735,253 Edward J. Seger, etc., ALCOA, Method and means for measuring electrode resistance, 1971.

The patent of ALCOA, USA (U.S. Pat. No. 3,735,253 Edward J. Seger, etc., ALCOA, Method and means for measuring electrode resistance, 1971) discloses a method and a device for measuring the electrical resistance of carbon electrodes. The device contains a set of current leads and voltage measurement sensors for the electrode surface that is in electrical contact with them. Current flows through the electrode along many paths between the current leads and multiple sensors. The total current along each path and the voltage drop in the electrode are measured to determine the electrical resistance of the electrode between the position on the contact surface of the current lead and the surface of the electrode in contact with the sensors. It is shown that this method can measure the electrical resistance of the electrode at temperatures up to 960° C.

The device for measuring the electrical resistance of the specimen surface with an 8-point sensor (U.S. Pat. No. 3,611,125, Meyer Sharon, Apparatus for measuring electrical resistance, 1969) enables to improve the accuracy of resistance measurements in the area close to edges of the anode body and other irregularities of the specimen. However, the measurement result is the specific resistance [Ohm/$m^2$], which can only indirectly and integrally characterize the specific electrical resistance in the anode volume.

In the paper of Guillaume Léonard, Ameline Bernard, Yann El Ghaoui, Marc Gagnon, Patrick Coulombe, Gontran Bourque and Stéphane Gourmaud. MIREA—An on-line real time solution to check the electrical quality of anodes/Proceedings of 33rd International ICSOBA Conference, 2015, pp. 455-466, the method for determining the quality of anodes using the MIREA unit is presented (MIREA means "instantaneous measurement of electrical resistance of anodes"). The system is based on non-destructive measurement of the electrical resistance of anodes when simulating the current distribution in the anode during electrolysis.

Unlike the conventional core sampling to determine the electrical resistance of anodes, which does not consider discontinuity of the anode structure and the current distribution in the stub hole area, the use of MIREA for quality inspection of anodes enables to measure the electrical resistance in real-time, does not destroy the structure of the anode and helps identify and reject anodes that have significant defects leading to premature failures of anodes in reduction cells or to excessive energy consumption.

At the Alouette plant in Canada, the MIREA device is installed at the output of anodes from anode baking furnaces. After cooling and subsequent diagnostics, high-quality anodes are sent to the reduction area and defective ones are sent to the conveyor for reprocessing.

The measurement process flow diagram includes the following successive steps: placing the anode in the unit, inserting contacts into the anode's stub hole, measuring the voltage drop in the anode, removing the unit's contacts from the anode's stub hole, and removing the anode from MIREA. At Alouette Smelter, MIREA is able to make a measurement in 60-66 seconds. MIREA is fully automated and requires limited maintenance. MIREA considers a significant influence of the stub hole area on the anode's electrical resistance, i.e. the main measuring element of MIREA is a plug of the stub hole, which simulates a standard anode bracket, through which current is supplied to the anode. The unit may also be used with stub holes of a non-standard shape. Using a voltmeter, a map of the voltage drop between the anode surfaces can be obtained. The voltage drop is measured between the starting point at the top of the anode and pre-defined positions on the surface of the anode (following a pattern). The pattern means taking measurements at points located on four columns along both sides on the surface of the anode and at 7 levels along the height of the anode; these columns are located between the stub holes. A total of 28 measurements are performed on each anode.

The quality ranking of anodes is random and relies on a mean-value analysis, i.e. the deviation of the voltage drop in the measured anode from the average voltage drop of the batch of anodes.

However, there is a standard and simple approach to the distribution of anodes by their quality that uses multi-factor analyses (K. Esbensen. Multivariate Data Analysis: In Practice: An Introduction to Multivariate Data Analysis and Experimental Design. 5th Edition, CAMO, Norway, 2004, pp. 598), such as the principal component analysis (PCA) with the Mahalanobis distance, to classify the anode into several quality categories.

The Mahalanobis distance is a distance between the data point (potential difference values of the anode) and the midpoint in multidimensional space (average value of the batch of anodes). This distance is used to identify irregular indicators. The higher the Mahalanobis distance for a particular anode, the higher the voltage values [mV] of this anode from the average value of the batch. Thus, this is an indicator of how the anode differs from the average anode of the batch. Anodes with a high Mahalanobis distance may be classified as defective.

The above methods of quality inspection of the anode, which are based on the use of Ohm's law, have the following disadvantages:
  Low accuracy of determining the location of defects, since the MIREA method can only determine the significance of the deviation of the relative electrical resistance, for example, of the right half of the anode from the left one, which means that more accurate determination of both the size and location of the defect (electrical resistance irregularity, cracks, cavities) is still an issue;
  The disadvantage of the MIREA method is the problem of instability of transition resistances of the contact area in stub holes of the anode where the known current is supplied because it is necessary to provide a large contact area of the current lead in the stub hole of the anode; moreover, the contact area must the same in all the stub holes of the anode;
  Another disadvantage is increased wear of sensor contacts (measuring electrical potentials on the side surfaces of the anode), instability of operation of the latter, which reduces the overall reliability of the system.

There are also methods and devices for flaw detection (inspection) of electrical resistance using electromagnetic induction.

U.S. Pat. No. 7,576,534, Adler et al., System and method to forecast the electrical conductivity of anodes for aluminium production before baking, 2004, describes the method and device to determine the electrical conductivity of an aluminium reduction cell anode before baking. In the device, at least one receiving coil is mutually inductively coupled to the electromagnetic field created by the block. The raw anode, or a part thereof, passes inside the receiving coil. The sensor is connected to the receiving coil and generates an output signal, inducing a variation of the electromagnetic field received by this coil. The value of the anode's electrical conductivity is then calculated using a signal from the sensor and signals previously obtained using sample anodes. The patent also shows the dependence of the conductivity (1/(μOhm·cm)) on the percentage of pitch in the anode and dependence of the conductivity (μOhm·cm)$^{-1}$ on the amplitude of the signal variation in relative units.

U.S. Pat. No. 5,473,248, Paul R. Haldemann et al., Method and apparatus for non-destructive detection of flaws in a carbon anode, 1995, discloses a method and an apparatus for in-line automatic quality inspection of carbon anodes. In this instance, eddy current losses and internal cavities in the carbon anode are measured, and the internal/apparent resistance of the anode is determined. The quality of the carbon anode is determined according to the measured eddy current losses and the measured resistance.

It is noted that traditional methods of measuring resistivity on the anode surface are characterized by problems related to the irregularity of transition resistances of point contacts. It is known that multiple (thousands of) discontinuities inside the anode create multiple irregularities in the DC resistance. As a result, the DC resistance variability is not an accurate way to determine internal cavities in the anode. Contact wear and shunting of current and contact potential with carbon dust create additional problems that lead to insufficient sensitivity of this method. A particular case of the claimed method is the use of the electromagnetic induction frequency of 2000 Hz+/−200 Hz.

Despite the apparent simplicity and cheapness of the claimed method, there is no practical confirmation of its effectiveness, and we can only assume the possibility of an integral (general) estimation of the anode irregularity, i.e. on the principle of detecting a significant deviation of the specific electrical resistance, for example, of the left half of the anode from the right one.

U.S. Pat. No. 7,123,004, Masumi Saka, et al., Method of non-destructive inspection of rear surface flaws and material characteristics using electromagnetic technique and apparatus thereof, 2004, discloses a non-destructive method for determining defects (cavities) and characterizing the electrical resistance of a material, using electromagnetic induction, where currents are supplied to a conductive object (anode) and defects/cavities at the back surface and adjacent surface of the object (anode) are evaluated. In this instance, the method for measuring the DC electrical potential is used, and the sensitivity of the method is increased by changing the distribution of electrical resistance inside the object (anode) by local heating of the front surface of the inspected object. Therefore, by increasing the electrical resistance at the nearest surface, compared to the electrical resistance at the back surface, the current at the back surface is increased.

Despite the apparent simplicity and cheapness of the above methods of flaw detection (inspection) of electrical resistance using electromagnetic induction, there are no known examples of their industrial mass application in the production of baked anodes of aluminium reduction cells. The applicability of these methods for such a massive object as a carbon anode is questionable due to several specific features and process difficulties of practical application.

Also, as in the above methods based on Ohm's law, the disadvantage is low accuracy of determining the location of defects, since it is only possible to determine the significance of deviation of the relative electrical resistance, for example, of the right half of the anode from the left one, which means that more accurate determination of both the size and location of the defect (electrical resistance irregularity, cracks, cavities) is still an issue.

Thus, from the above-mentioned methods of flaw detection (quality inspection) of anodes, the closest prototype is the MIREA method (Guillaume Léonard, Ameline Bernard, Yann El Ghaoui, Marc Gagnon, Patrick Coulombe, Gontran Bourque and Stéphane Gourmaud. MIREA—An on-line real time solution to check the electrical quality of anodes/ Proceedings of the 33rd International ICSOBA Conference, 2015, pp. 455-466), based on the use of Ohm's law, which is simple, inexpensive, highly productive (up to 60 anodes/ hour).

Nevertheless, these well-known similar inventions as well as the MIREA prototype, are represented by the measurement of scalar electrical quantities that characterize the electrical resistance of the anode block and the anode, which reduces the informational value of the measurements.

In addition, the MIREA method has the following disadvantages:

Low accuracy of determining the location of defects, because the method can only determine the significance of deviation of the relative electrical resistance, for example, of the right half of the anode from the left one;

Instability of transition resistances of the contact area in stub holes of the anode where the known current is supplied because it is necessary to provide a large contact area of the current lead in the stub hole of the anode, which must be the same in all the stub holes, which reduces the process capabilities of the method;

Increased wear of sensor contacts (measuring electrical potentials on the side surfaces of the anode), instability of operation of the latter, reducing the overall reliability of the system.

The technical problem of electromagnetic flaw detection of a baked carbon anode block of an aluminium reduction cell is the insufficient informational value of the measurement, low accuracy of determining the location of defects, reduced process capabilities as well as reduced reliability of the method, which causes insufficient accuracy of flaw detection and quality determination of the anode block.

INVENTION DISCLOSURE

The objective of the invention is the creation of a method for non-destructive flaw detection of anodes of aluminium reduction cells free from the stated disadvantages, including:

1. Increasing the informational value and accuracy of determining the location and/or size of defects (electrical resistance irregularity, cracks, cavities), by using the measurement of vector values of the electromagnetic field, generated by the current flowing through the carbon anode, rather than scalar ones.

2. Increasing the reliability of equipment by eliminating problems of instability of transient resistances at the point of sensor contacts with the surface of the carbon anode.

3. Reducing operating costs.

The technical result of the invention is a solution of the above objective, namely, improvement of the informational value of determining the location of defects, firstly, by the measurement of magnetic field intensity, wherein the number, the coordinates of current leads, the number and values of coordinates of sensors correspond to the matrix of coordinates of surface discretization points at the top face of the working anode block; secondly, by comparing vector values of the magnetic field (or magnetic induction) of the working anode block and the reference computer models, measured in the 3-dimensional space in the orthogonal coordinate system, which ultimately promotes to the improvement of accuracy of flaw detection and quality determination of the anode block.

The technical result of the invention is also an expansion of process capabilities of the method by reducing the instability of transition resistances of the contact area in the stub holes of the anode since the claimed method does not need to provide for a large contact area of each current supply, such area being identical for all the stub holes.

The technical result is also an increase in confidence and reliability of flaw detection by measuring the magnetic field intensity vectors with contactless sensors.

The technical result is achieved owing to the claimed method. A method for non-destructive flaw detection of aluminium reduction cell anodes is claimed, including the building of a computed model of an anode or the use of a specified model with known data on the geometry and specific resistance of the anode, the geometry and coordinates of internal defects, and, for this purpose:

1) using the model of the anode with the specified or known data at least on the geometry, specific electrical resistance of the anode as well as on the geometry and coordinates of the location of an internal defect manifested as a specific resistance irregularity, a crack or a cavity inside the anode, a numerical method is used to calculate the spatial current flow through the anode, as well as the amplitude and direction of vectors of the magnetic field intensity (or induction) near the outer surface of the anode, under boundary conditions of placement on the outer surfaces of the anode of at least a pair of electrically conductive contacts, which supply through the anode the specified amount of electrical current;

2) several cyclic calculations at step 1) are carried out under boundary conditions of placement on the outer surfaces of the anode of at least a pair of electrically conductive contacts, provided that the contacts are moved with the discretization interval that does not exceed at least double the length of the assumed defect;

3) the results of calculations at step 2) are represented in the form of a three-dimensional (3D) matrix of amplitudes and directions of vectors of calculated intensities (or inductions) of the electromagnetic field at the discretization points near the outer surface of the anode;

4) at least a pair of electrically conductive contacts that supply the specified amount of electrical current through the anode are placed on the outer surfaces of the inspected anode;

5) at least one sensor is placed near the outer surface of the inspected anode, and the amplitude and direction of the magnetic field intensity (or induction) vectors at the same discretization points as at steps 1)-3) are measured and represented as a three-dimensional matrix of measured magnetic field intensity (or induction) vectors;

6) the three-dimensional (3D) matrices of calculated and measured magnetic field intensity (or induction) vectors at the same discretization points near the outer surface of the anode are compared;

in the event of a permissible deviation of the measured and calculated values of the amplitude and direction of vectors at the same discretization points near the surface of the anode, the anode is recognized as high-quality; and, in the instance of a significant deviation, the anode is recognized as poor-quality.

In the claimed method, to determine defective anodes, it is reasonable to use the Mahalanobis distance, i.e. a distance between the data point, representing the values of the electromagnetic field intensity (or induction) at the anode discretization point and the midpoint in multidimensional space (average value of the batch of anodes); and the higher the Mahalanobis distance for a particular anode, the higher the values of the intensity (or induction) of the electromagnetic field of this anode from the average value of the batch; anodes with a high Mahalanobis distance are classified as defective.

Both direct and alternating current may be used.

If alternating current is used, the comparison of the measured and calculated voltages or inductions of the current electromagnetic field is made at the same discretization points of the anode surface, with the same amplitude, shape and phase angle of the specified amount of alternating current.

To measure the amplitude and direction of the magnetic field intensity or induction vectors, a combined sensor with three orthogonally positioned Hall sensors is usually used; in particular, to measure the amplitude and direction of the alternating electromagnetic field intensity or induction vectors, at least one combined sensor is used with three orthogonal inductive windings covering the portion of space centred at the discretization point near the outer surface of the anode.

Also, a variant of the method for non-destructive inspection of reduction cell anodes is claimed, which includes building a numerical model of the anode with the known data on the geometry and specific resistance of the anode, the geometry and coordinates of internal defects, according to which, for operations at steps 1), 2), 3), pre-calculated values in the form of a three-dimensional matrix of amplitudes and directions of vectors of calculated electromagnetic field intensities or inductions at the discretization points near the outer surface of the anode are used. This is about specified values, for example, based on a set of experimental data.

Since the spatial distribution of currents inside the anode should be correlated, obviously, with the spatial distribution of such defects as electrical resistance irregularity, cracks, cavities, therefore, it is possible to create a device and method for non-destructive flaw detection (quality inspection) of anodes, which is based on the measurement of the intensity vectors (or induction vectors) of the magnetic field.

For the case where distributed currents characterized by the field of the current density vector j are the source of the magnetic field, the formula of the Biot-Savart-Laplace law takes the following form (in the SI system):

$$B(r_0) = \frac{\mu_0}{4\pi} \int \frac{[jdV, r_0 - r]}{|r_0 - r|^3}, \quad (1)$$

where j=j(r), dV is a volume element, and integration is performed across the entire space (or across all its regions, where j≠0), r corresponds to the current point during integration (to the position of the dV element).

Devices for measuring magnetic induction and magnetic field intensity are called teslameters.

The most common devices for determining the magnetic field induction and intensity are: teslameters with a Hall generator, ferromodulation and nuclear resonance teslameters.

Teslameters with the Hall generator determine parameters of medium (from 10-5 to $10^{-1}$ T) and strong ($10^{-1}$ to $10^2$ T) magnetic fields. The principle of operation of such teslameters is based on the appearance of electromotive force in semiconductors placed in the area of influence of the magnetic field.

Figure 1:
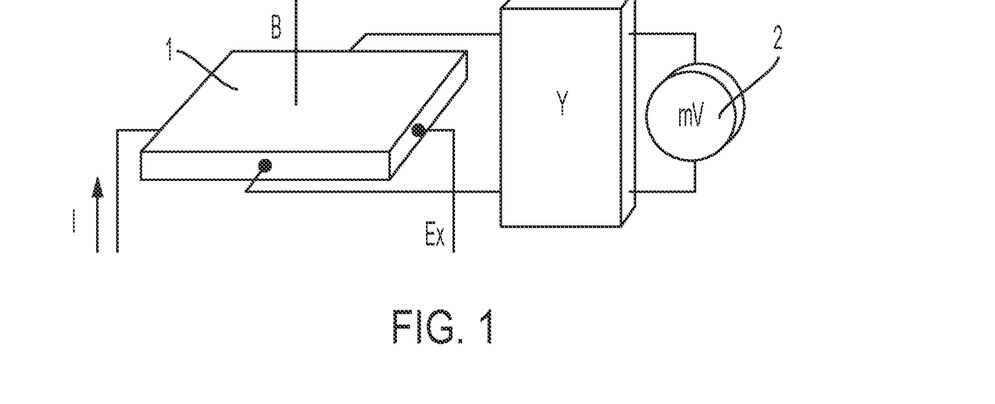
FIG. 1 shows an exemplary magnetic induction vector, according to some embodiments of this disclosure.

In this instance, the magnetic induction vector of the desired magnetic field (B) must be perpendicular to semiconductor plate 1 (FIG. 1).

The electrical current I flows through the body of semiconductor 1. As a result, the potential difference, Hall electromotive force ($E_x$), is formed on the side faces of the plate. The electromotive force passing through the amplifier (Y) is determined by the compensation method or millivoltmeter 2. For this purpose, the scale of the millivoltmeter is calibrated in Tesla. In practice, the Hall electromotive force depends on the design parameters of the semiconductor plate (coefficient C), current strength and magnetic induction:

$$E_x = C \cdot I \cdot B \quad (2)$$

Knowing the current strength I, the coefficient C and the value $E_x$, the device is graded in magnetic field units, provided that the current is constant.

Teslameters with the Hall generator are easy to use, have small dimensions, which enables to use them for measurements in small gaps. They are used to determine parameters of direct, alternating and pulse fields.

The measurement range of a conventional device is from $2 \cdot 10^{-3}$ to 2 T, with the relative error of ±1.5-2.5%.

Figure 2:
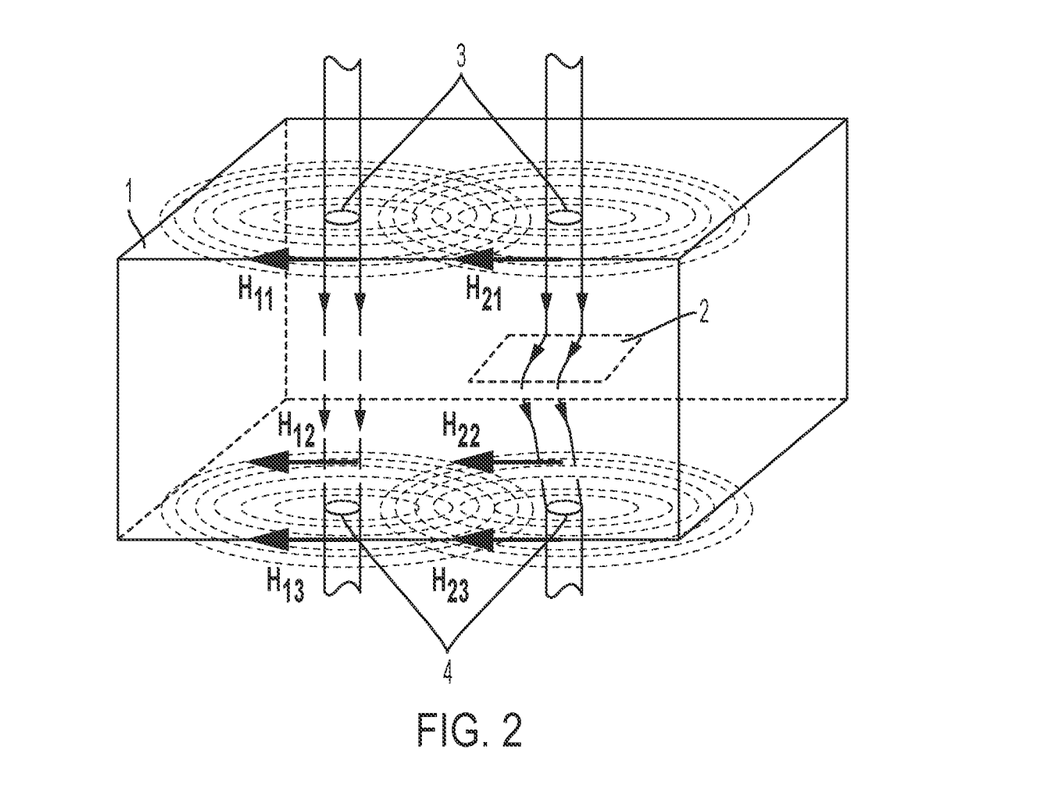
FIG. 2 shows an exemplary method for using a model of carbon anode to determine certain properties inside an anode, according to some embodiments of this disclosure.

The method's steps are explained in FIG. 2, where, using the theoretical model of carbon anode 1 with the known data on the geometry, the specific resistance of the anode and the geometry and coordinates of internal defect 2 in the form of a cavity or crack or specific resistance irregularity inside the anode, the volumetric distribution of current (I) through anode 1 is calculated using the finite element method, as well as the amplitude and direction of vectors ($H_1$, $H_2$, etc.) or magnetic field induction near the outer surface of anode 1, under the boundary conditions of placement on the outer surfaces of anode 1 of at least a pair of electrically conductive contacts 3 supplying a known amount of direct current (I) through anode 1.

At least one sensor 4 is placed on the outer surface of inspected anode 1 and the amplitude and direction of the magnetic field intensity (or induction) vectors at the same discretization points as in 1.1-1.3 are measured and stored as a 3D-matrix of measured magnetic field intensity vectors.

The 3D-matrices of calculated and measured magnetic field intensity or induction vectors at the same discretization points ($T_1$ and $T_2$) near the outer surface of anode 1 are compared;

Based on GOST R 8.736-2011, measurements of values of the amplitude and direction of vectors are conditioned by the presence of measurement errors. The Hall sensor has the relative measurement error of up to 2.5%; the spread of the anode electrical resistance parameters regulated by the production cycle may lead to the relative measurement error of up to 12%; the Hall sensor positioning error in automatic installation of the matrix of measuring sensors introduces an additional relative error of up to 2.5%; the contact quality when supplying electrical current may lead to a relative measurement error of up to 3%. As a result, the maximum value of the relative measurement error may reach 20%; thus, any deviation of the measured and calculated values of the amplitude and direction of vectors at the same discretization points near the surface of the anode, which is less than 20%, is not caused by a defect, and, in this instance, the anode is recognized as high-quality. Therefore, in the event of an insignificant deviation (less than 20%) of measured values of the amplitude and direction of intensity or induction vectors ($H_1$, $H_2$, etc.) at the same discretization points near the surface of anode 1 from the calculated ones, the anode is recognized as high-quality. In the event of a significant deviation (more than 20%) of actual values of the amplitude and direction of intensity or induction vectors ($H_1$, $H_2$, etc.) at the same discretization points near the surface of anode 1 from the ideal ones, the anode is recognized as poor-quality and is rejected.

Figure 3:
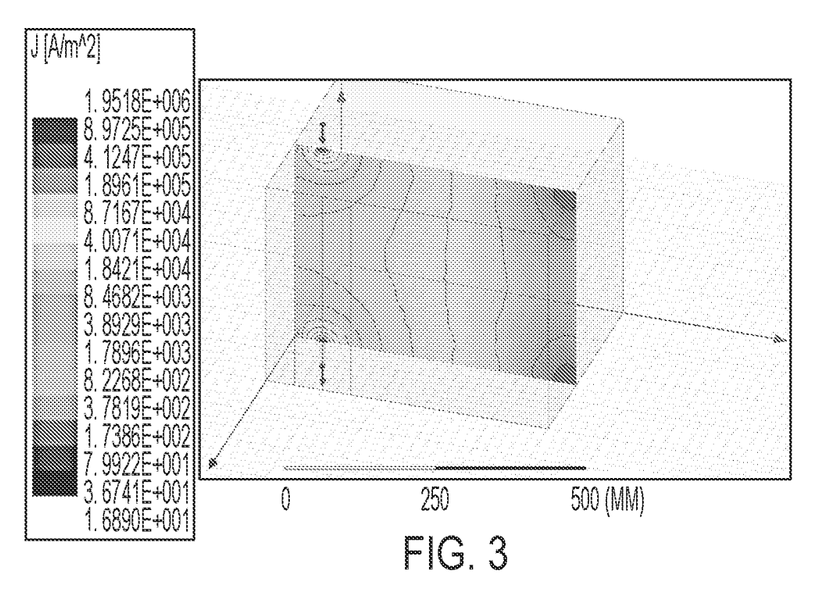
FIGS. 3-4 show current densities inside a carbon anode, according to some embodiments of this disclosure.

The method is explained by examples where the results of experimental data are shown in the form of graphs (3D-matrices) (FIG. 3, 4, 5, 6).

Figure 4:
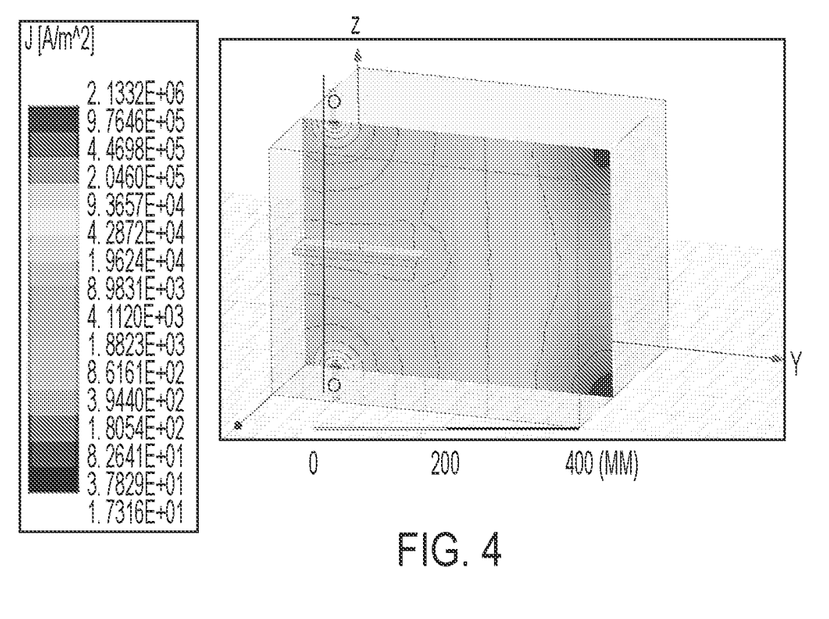
Figure 5:
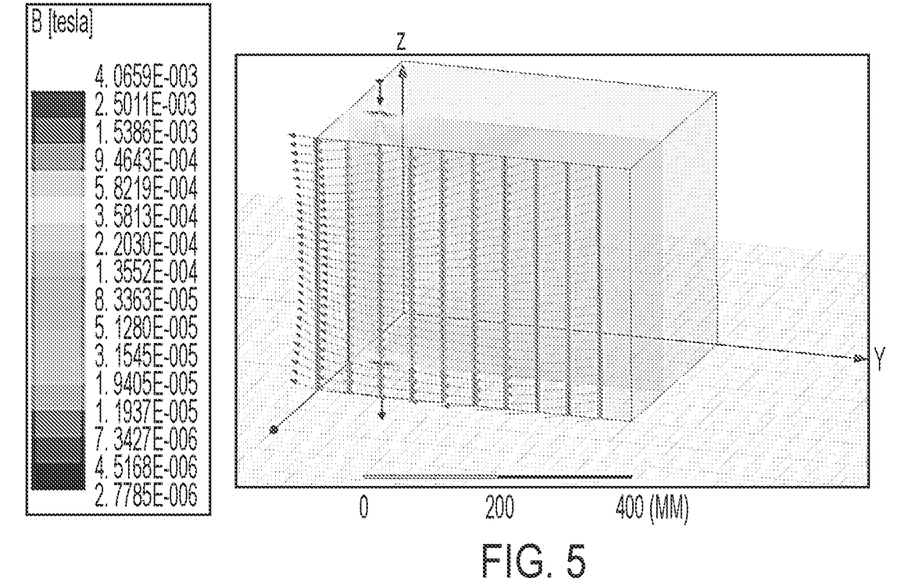
FIGS. 5-6 show vertical lines on a side surface of an anode, according to some embodiments of this disclosure.
Figure 6:
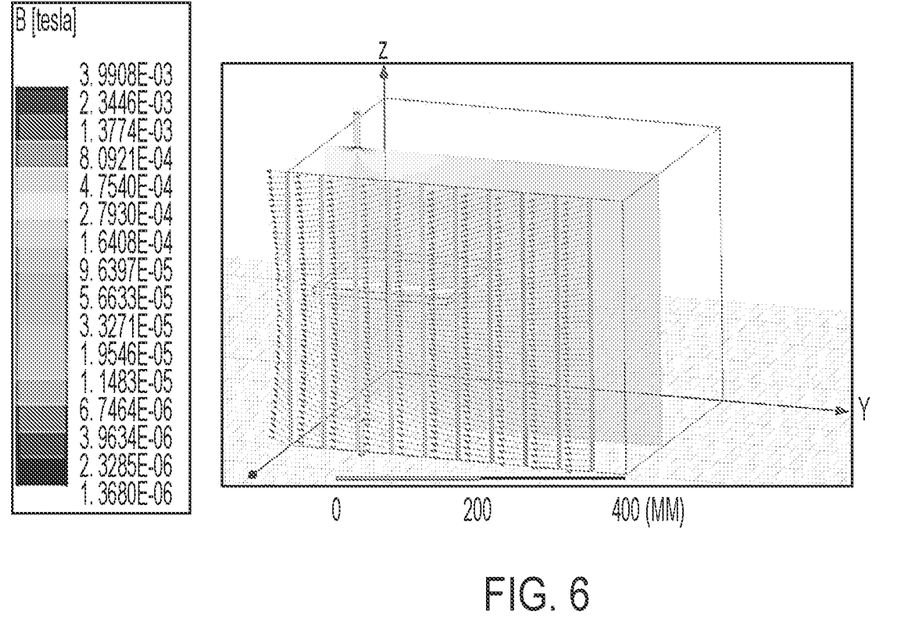

FIG. 3, 4 show current densities J [A/m$^2$] inside the carbon anode specimen both without internal defects and with a particular defect, for example, in the form of a horizontal crack/cavity 200×200×10 (FIG. 4). If there is a defect, the current bypasses it (along the path of least resistance) and is closer to the side surface of the anode block, thus introducing distortion to the pattern of magnetic field induction (or intensity) vectors B [T] by increasing the amplitude of these vectors at points located closer to the side surface of the anode, as shown in FIG. 5, 6. FIG. 5, 6 show ten vertical lines on the side surface of the anode, along which, at equidistant points, the calculated magnetic induction vectors of the field are derived. In FIG. 5, 6, the vectors show the direction, and the amplitude of the vector is represented by the colour of the vector. Comparing the colours of two magnetic induction vectors of the field at the same point on the side surface of the anode, other things being equal, one can see that, for example, at point [400;0;0], the colour of the magnetic induction vector of the anode with the internal defect is brighter than that at the same point in the anode without defects, i.e. the field vector of the anode with the defect has changed direction and increased in modulus.

Thus, it can be concluded that the presence of the defect (in the form of the horizontal crack (200×200×10 mm)) inside the anode causes a redistribution of the current path inside the anode, as a result of which the current tends to bypass the obstacle, thereby approaching the external side surface of the anode. At the same time, not only the amplitude of the current density closer to the side surface of the anode changes (increases) but also the direction of the current vectors changes. As a result, both the amplitude and direction of the field intensity or magnetic induction vector change, which is represented by relevant projections of the intensity or magnetic induction vector in the X-Y-Z orthogonal coordinate system.

Considering that the difference in projections of the amplitude and direction of the intensity or magnetic induction vectors on the coordinate axis can reach significant values, for example, from 20 to 100% relative to the original vector without a defect inside the anode, it is obvious that this method of anode flaw detection enables to reject anodes with defects, provided that the level of deviation in projections of the amplitudes and direction of the field intensity or magnetic induction vectors is specified.

The lower and upper limits of the range of deviations in projections of the amplitudes and the direction of the intensity or magnetic induction vectors may be set based on technical and economic production requirements, which ensure achievement of a cost-effective balance between the number and cost of rejected anodes and the economic effect of not using them downstream.

The invention provides for the following advantages:

The accuracy of determining the location of defects is increased as not only a significant difference in electrical resistance of the right half of the anode from the left one is determined as in the MIREA method, but also the size and location of a defect (electrical resistance irregularity, cracks, cavities) are determined more accurately, with the absolute precision of at least no less than double the length of the defect [probable defect sizes may be from 20 mm to 250 mm].

The problem of instability of transition resistances of the contact area in stub holes of the anode, where the known current is supplied following the MIREA method, is reduced because there is no need to provide for a large contact area of the current lead in the stub hole of the anode, such area being identical in all the stub holes of the anode.

This eliminates the problem of increased wear of sensor contacts (measuring electrical potentials on the side surfaces of the anode), instability of operation of the latter that reduces the overall reliability of the system since contactless sensors of magnetic field intensity vectors based on the principle of orthogonal Hall sensors or orthogonally located induction windings (on alternating current) are used.

The invention claimed is:

1. A method for non-destructive flaw detection of aluminium reduction cell anodes, including the building of a computed model of an anode or the use of a specified model with known data on a geometry and specific resistance of the anode, the geometry and coordinates of internal defects, characterized in that:
   1) using the computed model of the anode with the known data on the geometry, specific electrical resistance of the anode as well as on the geometry and coordinates of the location of an internal defect manifested as a specific resistance irregularity, a crack or a cavity inside the anode, a numerical method is used to calculate a spatial current flow through the anode, as well as an amplitude and direction of vectors of the magnetic field intensity or induction near the outer surface of the anode, under boundary conditions of placement on outer surfaces of the anode of at least a pair of electrically conductive contacts, which supply through the anode a specified amount of electrical current;
   2) several cyclic calculations at step 1) are carried out under boundary conditions of placement on the outer surfaces of the anode of at least a pair of electrically conductive contacts, provided that the contacts are moved with a discretization interval that does not exceed at least double the length of an assumed defect;
   3) results of calculations at step 2) are represented in a form of a 3D-matrix of amplitudes and directions of vectors of calculated intensities or inductions of an electromagnetic field at discretization points near the outer surface of the anode;
   4) at least a pair of electrically conductive contacts that supply the specified amount of electrical current through the anode are placed on the outer surfaces of an inspected anode;
   5) at least one sensor is placed near the outer surface of the inspected anode, and the amplitude and direction of the magnetic field intensity or induction vectors at the same discretization points as at steps 1)-3) are measured and represented as a 3D-matrix of measured magnetic field intensity or induction vectors;
   6) the 3D-matrices of calculated and measured magnetic field intensity or induction vectors at the same discretization points near the outer surface of the anode are compared;
   and, in the event of a permissible deviation (less than 20%) of the measured and calculated values of the amplitude and direction of vectors at the same discretization points near the surface of the anode, the anode is recognized as high-quality; in the event of a significant deviation (more than 20%) of measured and calculated values of the amplitude and direction of vectors at the same discretization points near the surface of the anode, the anode is recognized as poor-quality.

2. The method of claim 1, wherein to determine defective anodes, a Mahalanobis distance is used, representing values of electromagnetic field intensity or induction at the anode discretization point and a midpoint in multidimensional space (an average value of a batch of anodes); the higher the Mahalanobis distance for a particular anode, the higher the values of the electromagnetic field intensity or induction of the electromagnetic field of this anode from the average value of the batch of anodes; anodes with a high Mahalanobis distance are classified as defective.

3. A method of claim 1, wherein direct current is used.

4. The method of claim 1, wherein an alternating current is used, the comparison of the measured and calculated voltages or inductions of the current electromagnetic field is made at the same discretization points of the anode surface, with the same amplitude, shape and phase angle of the specified amount of alternating current.

5. The method of claim 4, wherein to measure the amplitude and direction of the alternating electromagnetic field intensity or induction vectors, at least one combined sensor is used with three orthogonal inductive windings covering the portion of space centred at the discretization point near the outer surface of the anode.

6. A method as per any of claims 1-4, wherein a combined sensor with three orthogonally positioned Hall sensors is used to measure the amplitude and direction of the magnetic field intensity or induction vectors.

7. A method for non-destructive inspection of reduction cell anodes, which includes building a numerical model of the anode with the known data on the geometry and specific resistance of the anode, the geometry and coordinates of internal defects of claim 1, characterized in that, for operations at steps 1), 2), 3), pre-calculated values in the form of a three-dimensional matrix of amplitudes and directions of vectors of calculated electromagnetic field intensities or inductions at the discretization points near the outer surface of the anode are used.

* * * * *